(12) United States Patent
Wehler et al.

(10) Patent No.: US 7,278,253 B2
(45) Date of Patent: Oct. 9, 2007

(54) ROBOT WITH A LINE GUIDANCE DEVICE

(75) Inventors: Herbert Wehler, Neunkirchen (DE); Uwe Kemper, Kreuztal (DE)

(73) Assignee: Kabelschlepp GmbH, Siegen (DE)

( * ) Notice: Subject to any disclaimer, the term of this patent is extended or adjusted under 35 U.S.C. 154(b) by 185 days.

(21) Appl. No.: 10/510,595

(22) PCT Filed: Mar. 28, 2003

(86) PCT No.: PCT/EP03/03265

§ 371 (c)(1),
(2), (4) Date: Apr. 12, 2005

(87) PCT Pub. No.: WO03/084721

PCT Pub. Date: Oct. 16, 2003

(65) Prior Publication Data

US 2005/0172606 A1    Aug. 11, 2005

(30) Foreign Application Priority Data

Apr. 11, 2002   (DE) ............................... 102 16 081

(51) Int. Cl.
*F16G 13/16* (2006.01)
*H02G 3/04* (2006.01)
(52) U.S. Cl. ..................... 59/78.1; 248/49; 248/51
(58) Field of Classification Search ............... 59/78.1; 248/49, 51
See application file for complete search history.

(56) References Cited

U.S. PATENT DOCUMENTS

| | | | | |
|---|---|---|---|---|
| 4,582,281 A | * | 4/1986 | Van Camp | ............... 248/51 |
| 4,840,023 A | * | 6/1989 | Borsani | ............... 59/78.1 |
| 5,635,675 A | * | 6/1997 | Houga | ............... 59/78.1 |
| 5,824,957 A | * | 10/1998 | Holshausen | ............... 59/78.1 |
| 5,900,586 A | * | 5/1999 | Carr | ............... 174/95 |
| 6,321,524 B1 | * | 11/2001 | Bro | ............... 59/78.1 |
| 6,374,589 B1 | * | 4/2002 | Kunert et al. | ............... 59/78.1 |
| 6,440,888 B1 | * | 8/2002 | Stamires et al. | ............... 502/80 |
| 6,578,350 B2 | * | 6/2003 | Blase et al. | ............... 59/78.1 |

FOREIGN PATENT DOCUMENTS

| | | |
|---|---|---|
| DE | 44 26 598 C1 | 12/1995 |
| DE | 196 17 900 A1 | 12/1996 |
| DE | 197 16 695 C1 | 12/1998 |
| DE | 197 28 284 A1 | 2/1999 |

(Continued)

OTHER PUBLICATIONS

Schutz, Schlauchpaketlosungen, KEM Sonderheft 2, Aug. 2001, 2pgs.

(Continued)

*Primary Examiner*—David B Jones
(74) *Attorney, Agent, or Firm*—Smith Law Office

(57) ABSTRACT

The subject matter of the invention concerns a robot with at least one conductor guiding apparatus (1) running at least partially on the outside, in which guiding apparatus conductors, hoses or similar are guided. The conductor guiding apparatus (1) has at least one spatially deflectable section formed by members (4) each having a central body (5) through which a flexible linking element (6) extends. The members (4) form a channel (9) for accommodating supply conductors.

21 Claims, 10 Drawing Sheets

FOREIGN PATENT DOCUMENTS

Figure 1:
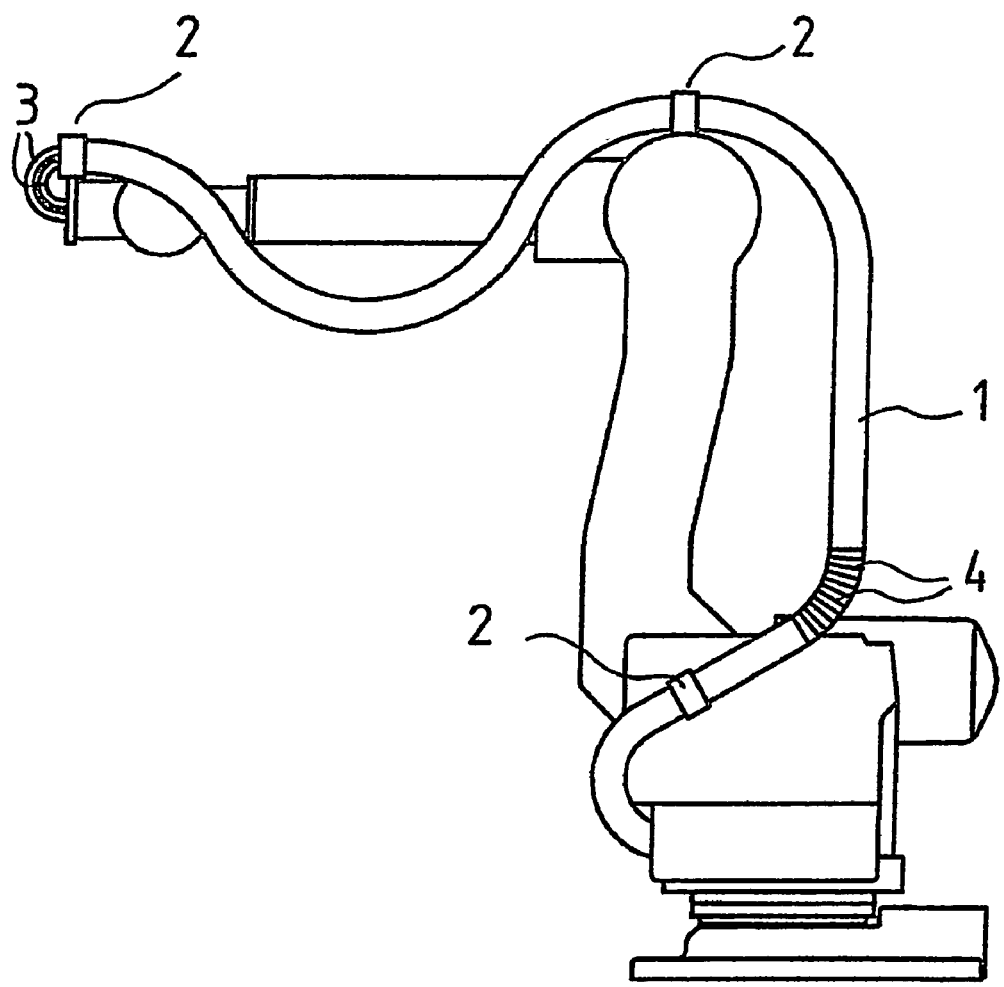

| | | |
|---|---|---|
| DE | 299 04 796 U1 | 8/1999 |
| DE | 299 04 652 U1 | 5/2000 |
| DE | 200 08 054 U1 | 12/2000 |
| DE | 200 12 232 U1 | 12/2000 |
| DE | 200 07 000 U1 | 7/2001 |
| DE | 201 12 491 U1 | 7/2001 |
| DE | 200 10 696 U1 | 8/2001 |
| DE | 200 14 649 U1 | 10/2001 |
| DE | 201 13 742 U1 | 12/2001 |
| DE | 201 13 950 U1 | 12/2001 |
| DE | 201 13 962 U1 | 12/2001 |
| EP | 0 260 740 A2 | 9/1987 |
| EP | 0 197 546 B1 | 2/1989 |
| EP | 0 676 840 A1 | 4/1995 |
| EP | 0 789 167 A1 | 8/1997 |
| EP | 0 787 378 B1 | 7/1998 |
| EP | 0 875 695 A1 | 11/1998 |
| EP | 0 979 967 A2 | 2/2000 |
| FR | 1365129 | 6/1964 |
| WO | WO93/05556 | 3/1993 |
| WO | WO96/35887 | 11/1996 |
| WO | WO98/40645 | 9/1998 |
| WO | WO98/52265 | 11/1998 |
| WO | WO 00/41284 | 7/2000 |
| WO | WO 01/09532 A1 | 2/2001 |

OTHER PUBLICATIONS (English Translation) Schutz, Hose Package Solutions, Aug. 2001, 4pgs.

* cited by examiner

ROBOT WITH A LINE GUIDANCE DEVICE

The subject matter of the invention concerns a robot with at least one conductor guiding apparatus running at least partially on the outside of the robot, in which guiding apparatus conductors, hoses or similar are guided.

The designation robot refers in particular to industrial robots, as used, for instance, in automated car manufacturing. In principle, in the broader sense, any handling device is also meant by this, and in particular such as are conceived for industrial use.

In the case of a robot, conductors, hoses or similar, hereinafter known as supply conductors serve to supply the tool arranged at the robot hand.

For the guiding of the supply conductors, sleeve hoses are used. The supply conductors are laid within the sleeve hose. The sleeve hose is guided at least partially on the outside of the robot. It is known that the sleeve hose is attached to the robot itself, whereby the attachment of the sleeve hose takes place in a manner such that the sleeve hose may follow the movement of the robot, particularly of the robot hand. Such a design of the robot with a conductor guiding apparatus running at least partially on the outside in which conductor guiding apparatus conductors, hoses or similar are guided is known from the publication DE20113950U1.

From the printed publication DE20010696U1, a device for attachment of cables of a sleeve hose is known. The supply conductors of a robot are guided within the sleeve hose. The device is distinguished in that the sleeve hose is held axially fixed and a cable nut holding the cables in force-fitting manner is held fixed axially and in rotation-proof manner in a clamp.

With regard to the guiding of supply conductors, a hose guide in the base of a robot is also known from the Utility Model publication DE20008054U1. The hose guide has a hose with a lower and an upper hose arm linked to each other via a bent hose head. The upper hose is guided offset in the horizontal direction relative to the lower hose arm. Due to the horizontal offset of the upper hose arm relative to the lower hose arm, it is to be achieved that the hose head linking these two is inclined to the vertical and this results in a low belly height. It is also achieved that the hose head no longer rubs along the base wall and the resultant wear is thereby removed.

Due to the movement of the robot, a corresponding movement of the sleeve hose takes place. Since the conductors, hoses or similar fed through the sleeve hose are arranged outside the neutral limit, a relative movement takes place between the conductors. During this relative movement, the conductors, hoses and similar rub against each other and this is associated with wear. This wear can cause destruction of the supply conductors, leading to failure of the robot. In order to avoid this, it is known that the supply conductors are laid within a lubricating medium inside the sleeve hose, as described in the article "Schlauchpaketlösungen" [Hose Package Solutions] in KEM, special volume 2, August 2001.

A problematic factor in such a solution is the fact that the total mass of the sleeve hose and the supply conductors significantly increases. Furthermore, in situ repair is not possible or only with significant difficulty. However, in order not to have to interrupt the production process for long, suitable sleeve hoses are therefore supplied as spare parts with the supply conductors provided for the robot in question. This leads to a not insignificant level of investment expenditure.

Filling with the lubricant and the conductors makes it necessary for the sleeve hose to have a minimum load capacity. In order to increase the minimum load capacity of the sleeve hose, it is necessary to design it correspondingly rigid, which corresponds to the contrary requirement for mobility of the sleeve hose during operation of the robot.

Based on this starting point, the present invention is based in the aim of providing a robot in which supply conductors are securely and reliably guided without the operation of the robot being impaired.

This aim is fulfilled by a robot having a conductor guiding apparatus for guiding conductors, hoses and the like, the conductor guiding apparatus having: a plurality of members, each member having a central body and defining a conductor channel; and a flexible linking element extending through the central body of the members to join the members together for relative movement to one another.

The robot according to the invention with at least one conductor guiding apparatus at least partially running on the outside, in which apparatus conductors, hoses or similar are guided, is distinguished in that the conductor guiding apparatus has at least one spatially deflectable section formed by members each having a central body through which a flexible linking element extends. The members form a channel for accommodating conductors, hoses or similar.

By means of this design of the robot according to the invention, the possibility of secure and reliable guiding of supply conductors is provided. The supply conductors are guided in the channel formed by the members. The members are linked with a flexible linking element, so that this flexible linking element substantially absorbs the forces arising during operation of a robot which act upon the conductor guiding apparatus. By means of this design according to the invention of the conductor guiding apparatus on the robot, a substantially functional decoupling between the uptake of forces and the guiding of the supply conductors is achieved.

According to an advantageous further development of the robot, it is proposed that adjacent members be linked to each other in form-fitting manner. Form-fitting is sufficient to achieve a secure holding together of the members, since the flexible linking element absorbs the actual force acting on the conductor guiding apparatus.

In order to realize a spatially deflectable section of the conductor guiding apparatus, it is proposed that at least two adjacent members should be linked together via a ball joint. The advantage of the design of a ball joint as linking element between two adjacent members is that the adjacent members are spatially deflectable, whereby the design of the ball joint as such is simple from the design standpoint.

According to a further advantageous embodiment of the robot, it is proposed that means should be provided through which the spatial deflection of the conductor guiding apparatus is limited. The extent of the limitation is adapted to the movement of the robot.

The means by which the spatial deflection is limited preferably comprise a stop and at least one counterstop. In particular, it is proposed that the at least one stop be formed by a projection directed radially outwards, said projection engaging in a recess.

In order to reduce the assembly effort for formation of the conductor guiding apparatus and to ensure the function of the conductor guiding apparatus, according to a still further advantageous embodiment of the robot, it is proposed that the at least one projection is formed on the joint body and the recess is formed in the joint socket. If the joint connection between two adjacent members is a ball joint, it is advantageous if the projection is formed on the ball head and the recess is formed in the joint socket.

In order to ensure that the loading of the stop and of the counterstop are not excessive, it is proposed that at least two projections are provided, arranged equidistant from each other.

The conductors, hoses or similar fed through the conductor guiding apparatus are guided in a channel formed by the members. Preferred is a design of the channel which is achieved in that the central body is provided with at least one web joined to one wall, whereby the wall and the central body delimit a channel.

If a plurality of webs are provided, the channel may be divided into a plurality of partial channels in which individual or a plurality of conductors, hoses or similar are guided.

According to another advantageous embodiment, it is proposed that the wall which partially delimits the channel has at least one gap extending in the longitudinal direction of the central body. By means of this measure, the possibility is created of introducing a conductor through the gap into the channel. The possibility also exists of removing a conductor from the channel through the gap. This has the advantage that a repair-facilitating design of the conductor guiding apparatus is achieved.

In order to protect the conductors that are guided in the conductor guiding apparatus, it is advantageous that the wall is so designed that sections of the walls of two adjacent members overlap each other. By this means, an at least partially closed conductor guiding apparatus is achieved.

In order to attach the conductor guiding apparatus to a robot, holders are provided. Preferably the holders have a clamp-like design, whereby these interact with the wall of a member. The attachment of a member in a holder may be in form-fitting or force-fitting manner.

From DE20112491U1, a robot with a conductor guiding apparatus is known. In the region of the base, this robot has a basket in which one or more loops of the conductor guiding apparatus are laid. From the utility model DE20008054U1, it is known that the robot has a conductor guiding apparatus in the base region having a lower and an upper hose arm connected to each other with a bent hose head. The upper hose is guided offset relative to the lower hose arm offset in the horizontal direction.

A robot according to the invention is proposed having at least one conductor guiding apparatus at least partially running on the outside of the robot, in which apparatus conductors, hoses or similar devices are guided, as described above, and used in combination with an apparatus for guiding and storing the conductor guiding apparatus in the base of the robot, whereby the apparatus has a guiding region formed in a first plane and storage region formed in a second plane different from the first plane.

In particular, it is proposed that the robot have a guiding region lying in a substantially horizontal plane. By means of this guide channel, a simplified and secure guidance of the conductor guiding apparatus is achieved.

According to a further proposal, the planes in which the guiding region and the storage region lie subtend an angle of up to 90° to each other. Preferable in this regard is a design in which the storage region lies in a substantially vertical plane.

The guiding region is preferably designed in the form of a channel, by means of which a secure and reliable guiding of the conductor guiding apparatus is achieved. This is particularly advantageous if the robot is rotated about an axis substantially perpendicular to the plane of the guiding region.

The form of the guiding region is, in particular, so designed that it corresponds to the movement of the robot. In particular, the guiding region is arc-shaped and, in particular, in the form of a partial circle, preferably annular.

In order to design the storage region as compactly as possible, in order thus to reduce the space requirement, it is proposed that the conductor guiding apparatus have an upper strand and a lower strand, whereby the upper strand and the lower strand are linked to each other by a curved region.

The end of the lower strand is arranged in fixed position. In order to simplify exchange of the conductor guiding apparatus, it is proposed that the guiding region and the storage region be releasably joined to each other. This opens up the possibility of removing the storage region in order thus to reach the locally fixed connection of the conductor guiding apparatus. A further advantage of the releasable connection between the guiding region and the storage region may be seen therein that storage regions of different storage volumes are provided, to which the requirements of the robot are adapted.

In order to influence the movement sequence of the robot through the conductor guiding apparatus as little as possible and in order to reduce the forces acting on the conductor guiding apparatus as much as possible, it is proposed that between the guiding region and the storage region, a transition region be provided which allows frictionless execution of the movements.

According to a further advantageous embodiment of the robot, it is proposed that the guiding region, the storage region and/or the transition region are at least partially designed as formed parts and, in particular, as sheet metal formed parts.

The members of the conductor guiding apparatus are preferably designed in a single part. In particular, it is proposed that the members are injection moulded parts. Depending on usage, the members may be made from plastics or from fibre-reinforced plastics. The conductor guiding apparatus may be made deep with members as a metal chamber, in particular, made of a light metal.

Figure 2:
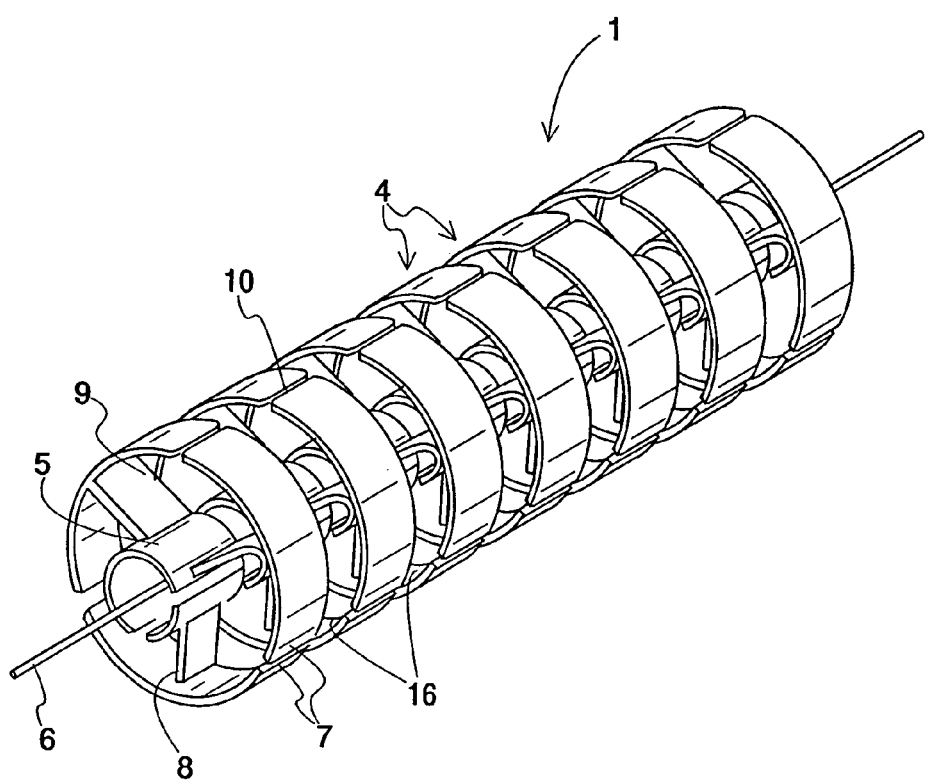
Figure 3:
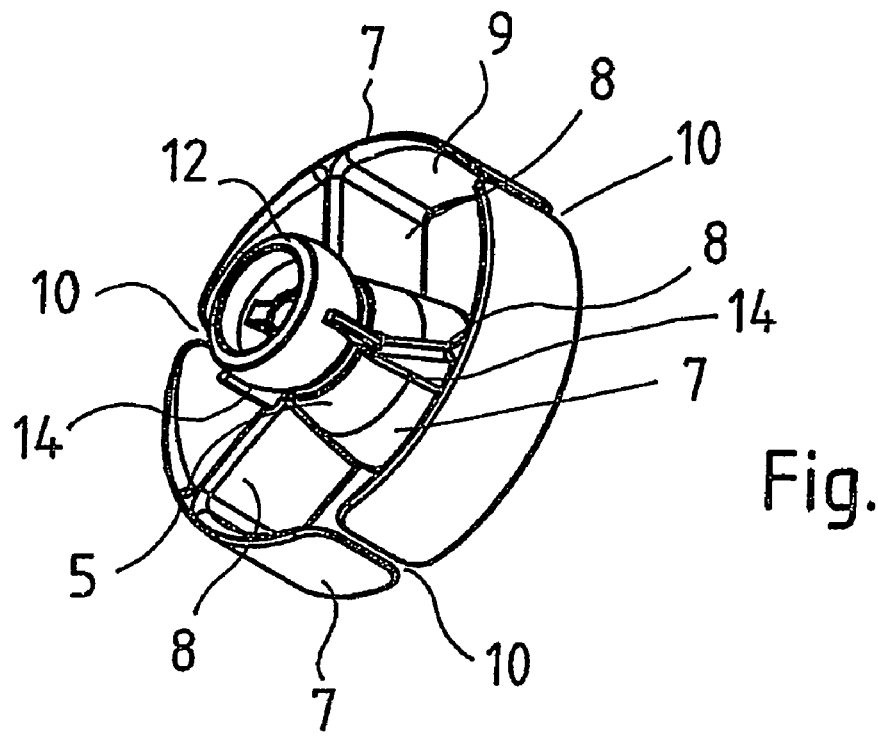
Figure 4:
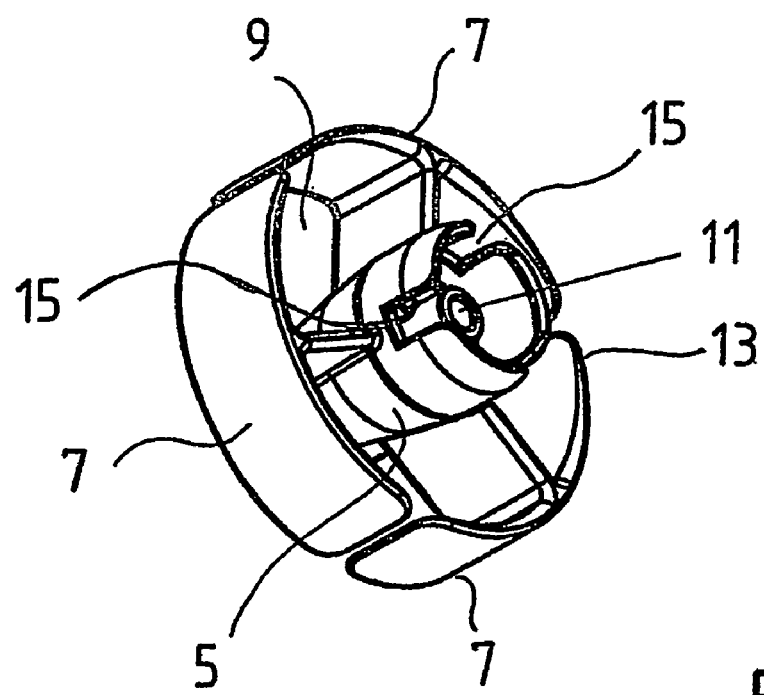
Figure 5:
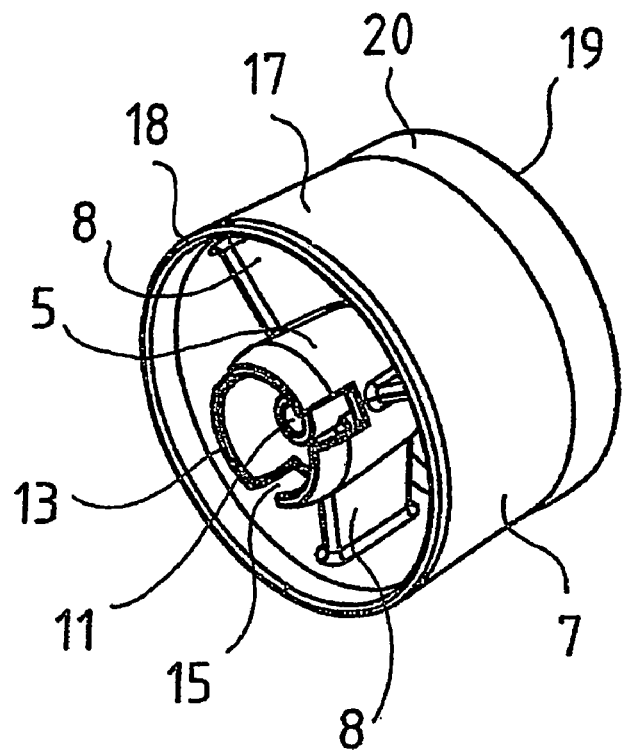
Figure 6:
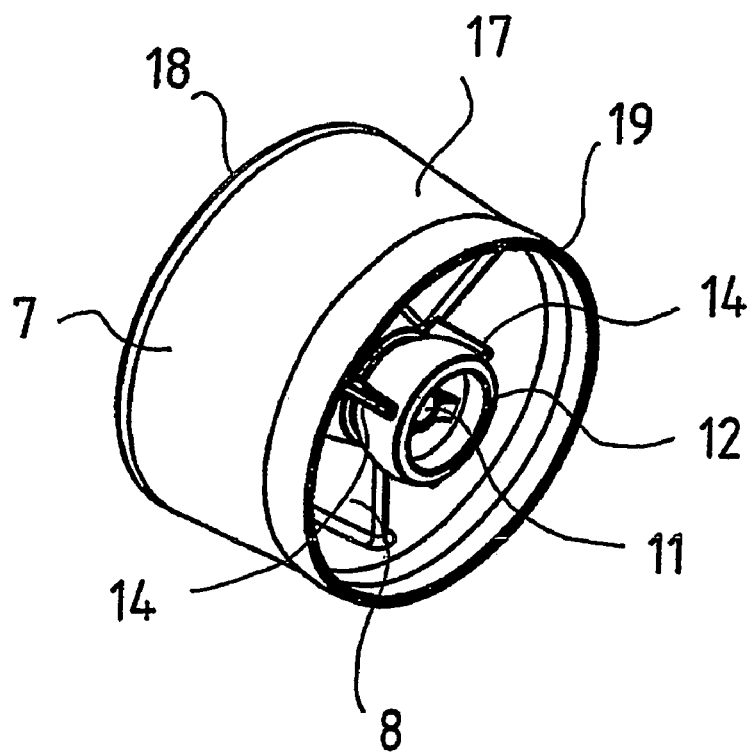
Figure 7:
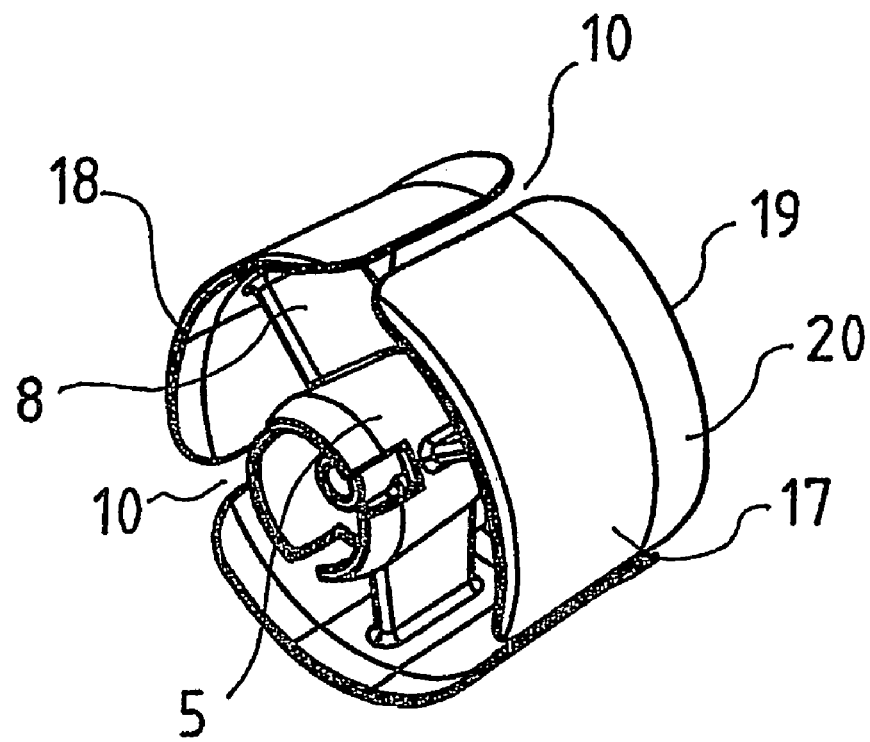
Figure 8:
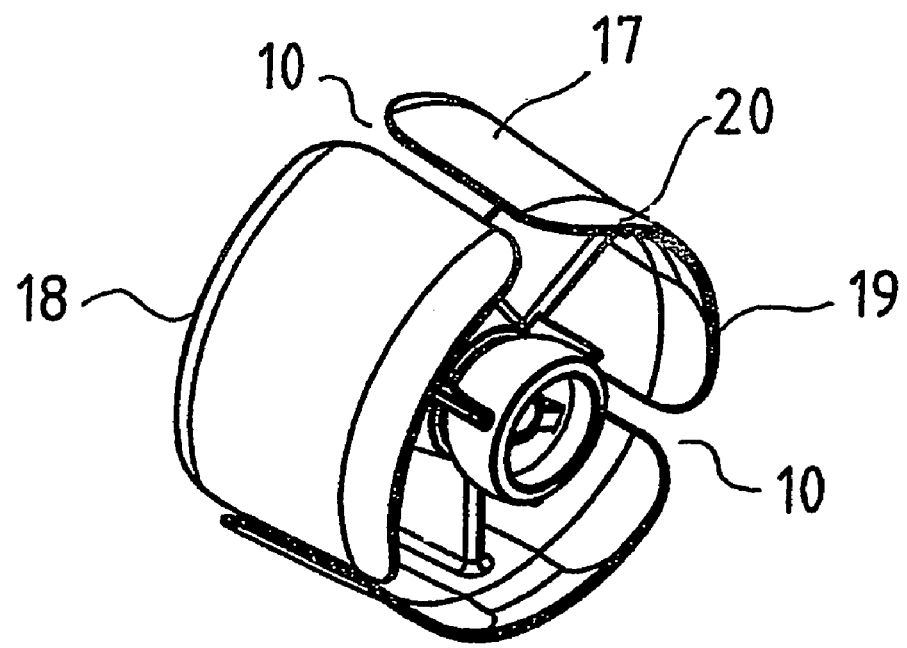
Figure 9:
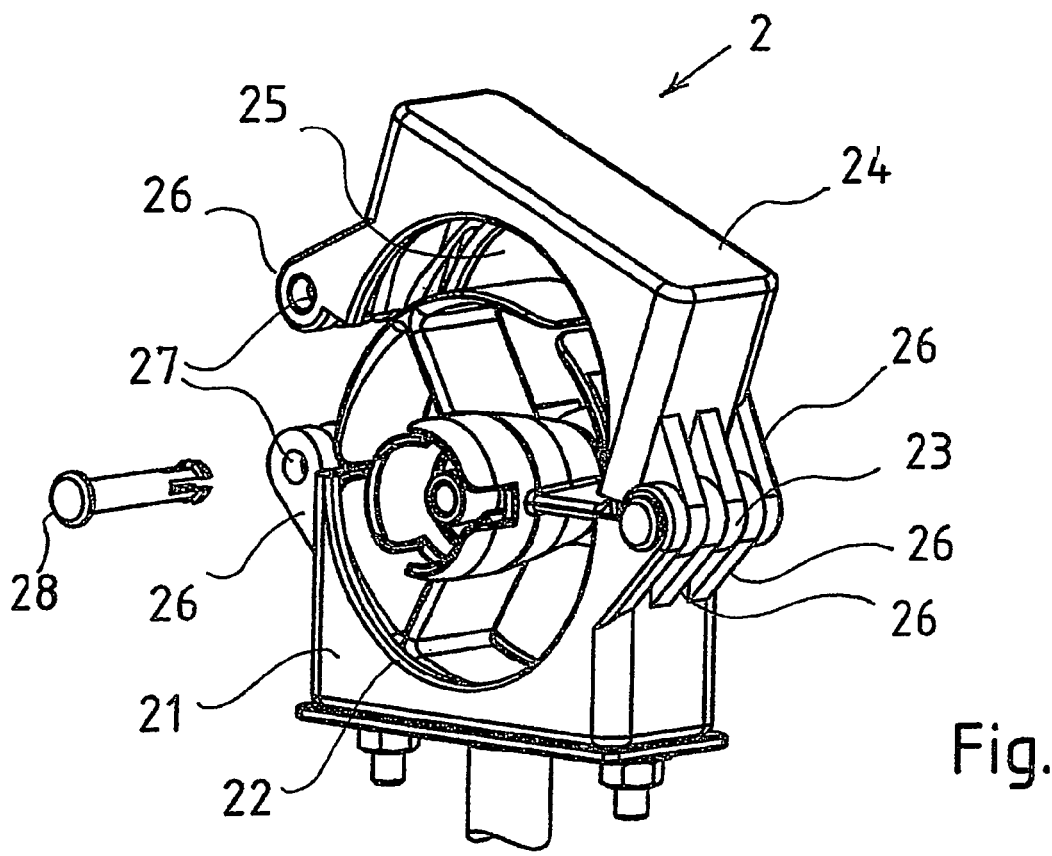
Figure 10:
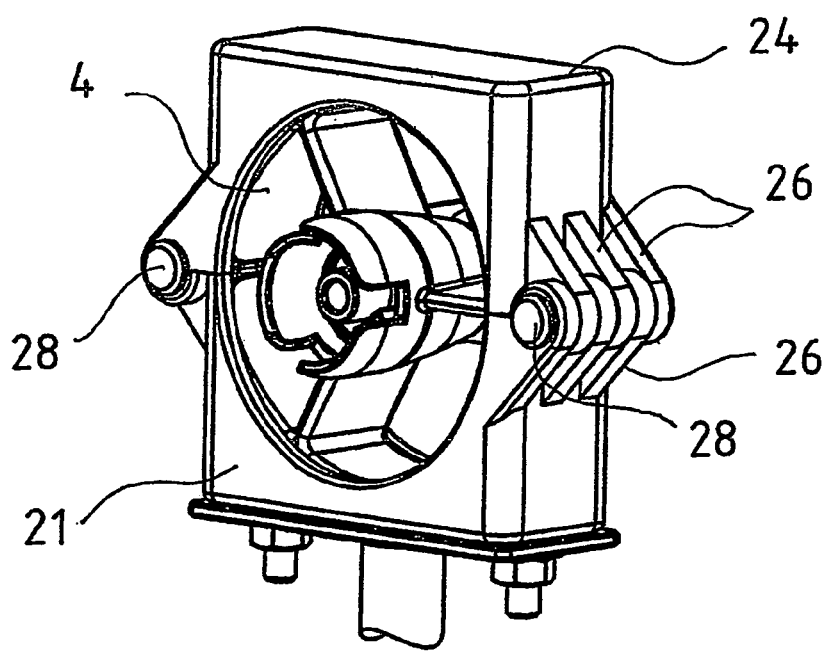
Figure 11:
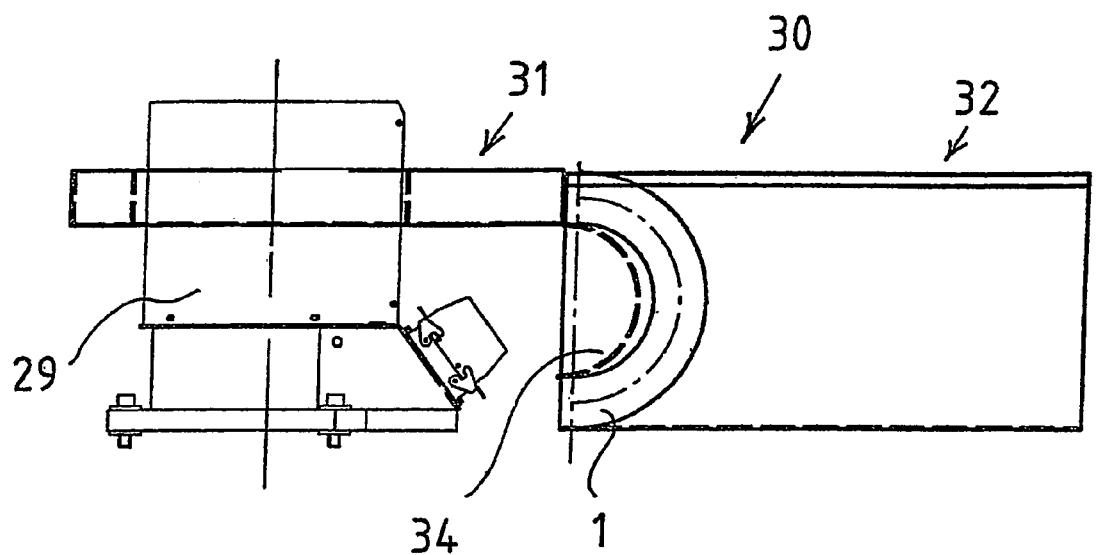
Figure 12:
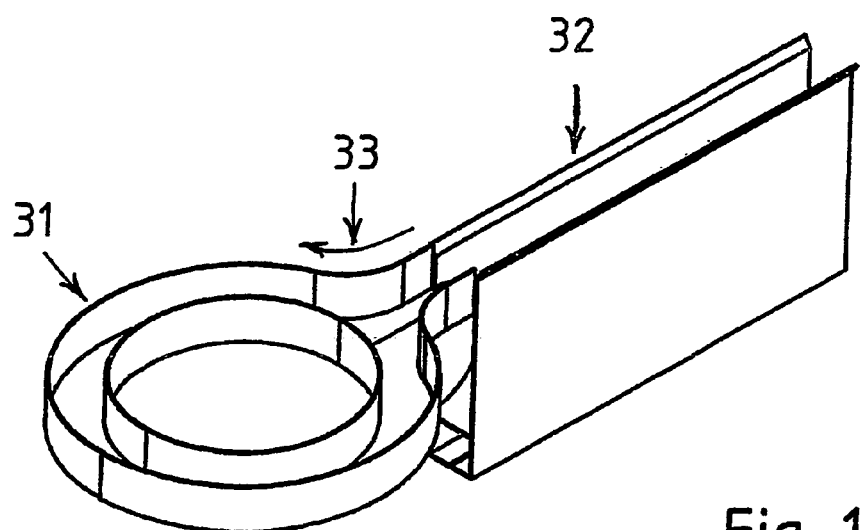
Figure 13:
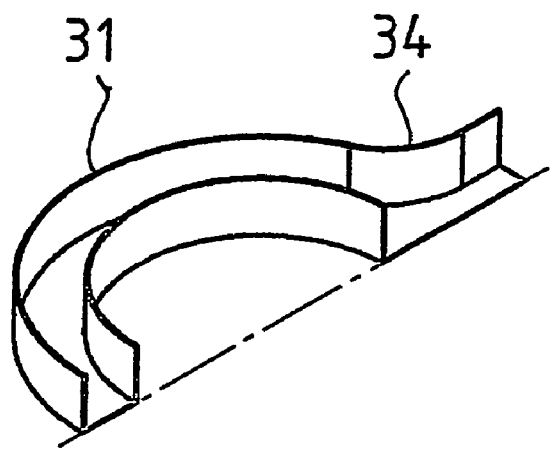
Figure 14:
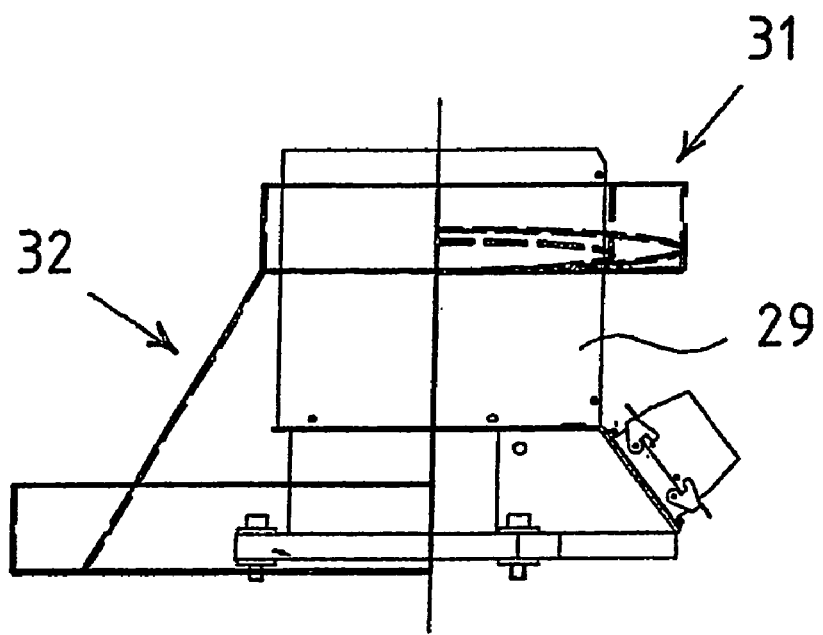
Figure 15:
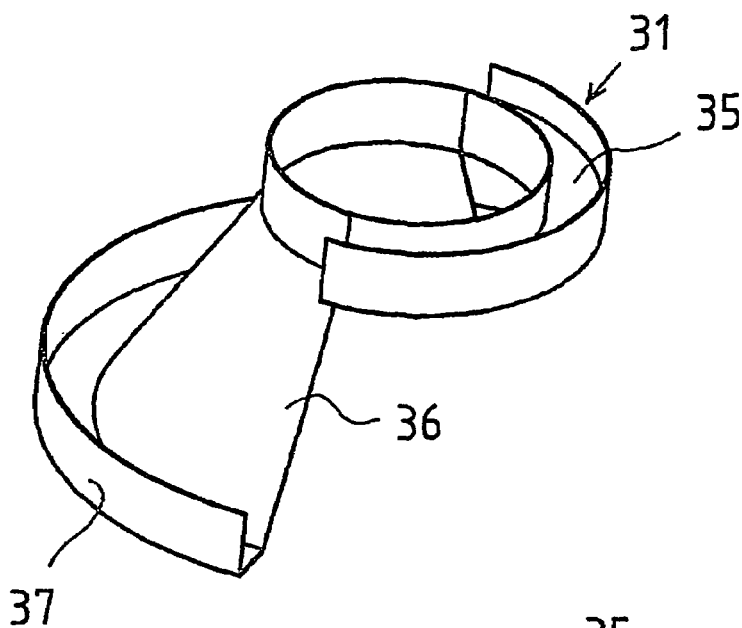
Figure 16:
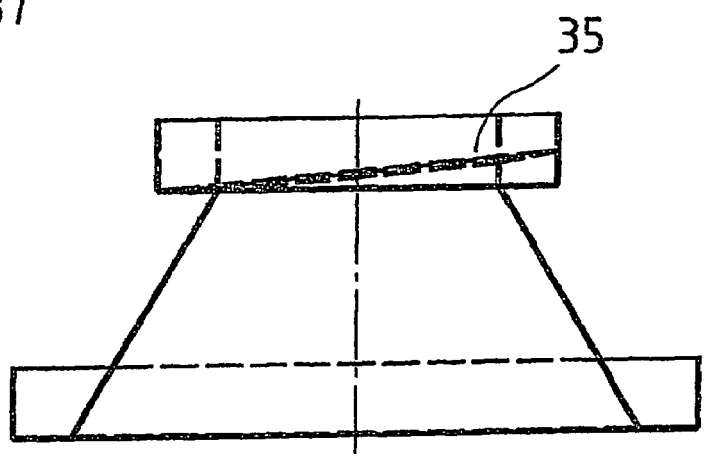
Figure 17:
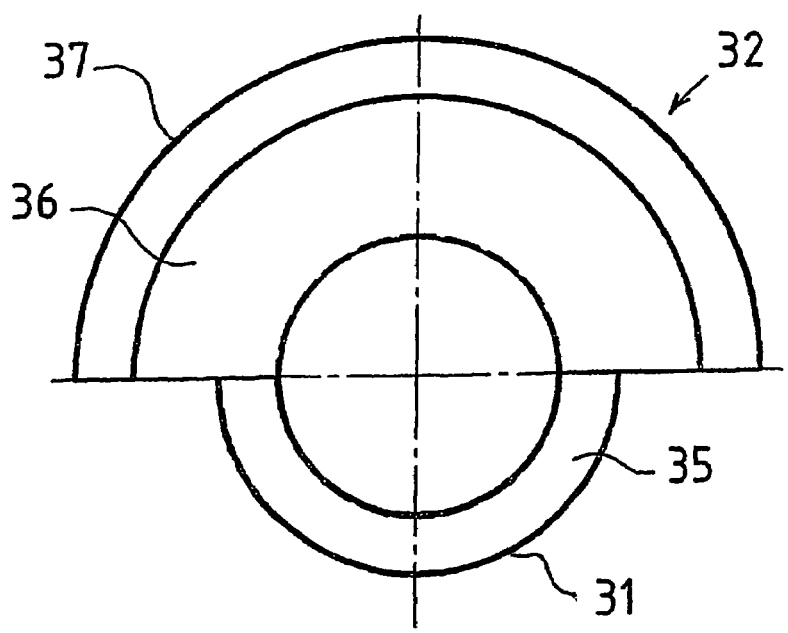
Figure 18:
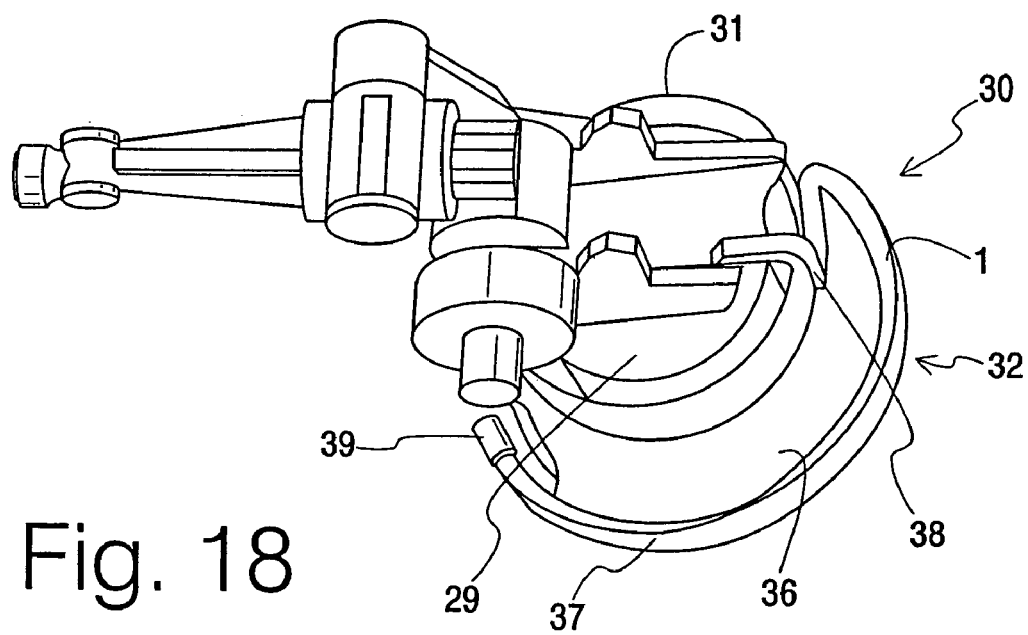
Figure 19:
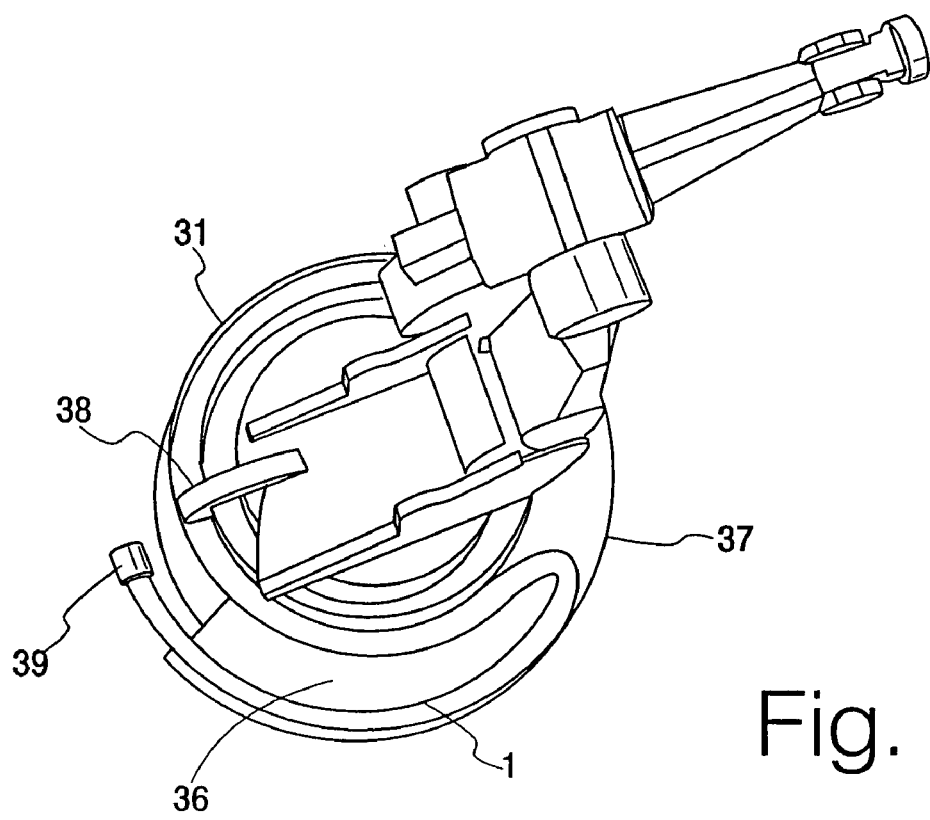

Further details and advantages of the invention will now be described based upon the embodiments illustrated in the drawings. However, the subject matter of the invention is not restricted to these embodiments. The drawings show the following:

FIG. 1 shows a robot with a conductor guiding apparatus,

FIG. 2 shows a perspective view of a section of a conductor guiding apparatus, FIG. 3 shows, in perspective, a member of the conductor guiding apparatus according to FIG. 2 in a front view, FIG. 4 shows the member of the conductor guiding apparatus according to FIG. 2 in a back view, FIG. 5 shows a further embodiment of a conductor guiding apparatus in a perspective view from the front, FIG. 6 shows the member according to FIG. 5 in a perspective view from behind, FIG. 7 shows a third embodiment of a member of a conductor guiding apparatus in a perspective view from the front, FIG. 8 shows the member according to FIG. 7 in a perspective view from behind, FIG. 9 shows, in perspective, a holder in the opened condition for attaching the conductor guiding apparatus to a robot, FIG. 10 shows, in perspective, the closed holder, FIG. 11 shows schematically an apparatus for guiding and storing a conductor guiding apparatus in the base region of a robot in a front view, FIG. 12 shows the apparatus for guiding and storing the conductor guiding apparatus according to FIG. 11 in a perspective view, FIG. 13 shows a part of the apparatus according to FIG. 11 in perspective, FIG. 14 shows a second embodiment of an apparatus for guiding and storing a conductor guiding apparatus in the base region of a robot in a front view, FIG. 15 shows, in perspective, the apparatus according to FIG. 14, FIG. 16 shows a side view from the right side of the apparatus according to FIG. 14, FIG. 17 shows a plan view of the apparatus according to FIG. 14, FIG. 18 shows, in perspective, in a view from obliquely above, a robot with an apparatus according to FIG. 14 in a first position, and FIG. 19 shows, seen in perspective from obliquely above, a robot with an apparatus according to FIG. 14 in a second position.

FIG. 1 shows schematically a known robot in a side view with a conductor guiding apparatus running on the outside. In the conductor guiding apparatus, conductors, hoses or similar which serve to supply the robot or the robot tool are guided. The conductors guided in the conductor guiding apparatus 1 are denoted with the reference number 3.

The conductor guiding apparatus 1 is attached to the robot with holders 2. The arrangement of the holders and/or the number of holders may vary. However, it must always be ensured that destruction of the conductor guiding apparatus through the movement of the robot does not occur.

FIG. 2 shows schematically the design of a conductor guiding apparatus 1 in which conductors, hoses or similar are guided. For reasons of clarity, the illustration in FIG. 2 does not include such conductors, hoses or similar device. The guiding apparatus 1 comprises members 4 joined to each other in articulated fashion. The members 4 each have a central region 5 through which a flexible linking element 6 extends.

The flexible linking element may, for instance, be a rope made of metal, formed from a plurality of filaments.

The conductors, hoses or similar are guided in a channel 9. In the embodiment shown, the conductor guiding apparatus 1 has three channels 9, each of which may be loaded with a conductor from outside through a gap 10. The gap 10 is so dimensioned that during operation of the conductor guiding apparatus, conductors cannot escape from the channel 9.

In FIGS. 3 and 4, a member 4 of the conductor guiding apparatus 1, as represented in FIG. 2, is shown. The member 4 has a central body 5. The central body 5 contains a passageway 11 extending in the longitudinal direction of the central body, through which the flexible linking element 6 is fed.

On the outer jacket of the central body 5, in the embodiment shown, three webs 8 are provided. The webs 8 are arranged equidistant from each other seen in the circumferential direction of the central body 5.

Joined to every web 8 is a wall 7 which is designed partially circular. The walls 7 lie on an imaginary circumferential circle. Between two adjacent walls 7, a gap 10 is formed. A conductor may be introduced through the gap 10 into the channel 9 or removed from it. The thickness of the wall 7 decreases from the web 8 in the direction of the gap 10. Due to the curvature of the wall and the decrease in material thickness, an end region of the wall 7 is flexible, whereby the bending force necessary in order to bend the end region in the direction of the central body 5 is smaller than the force required to bend this end region away from the central body 5. By means of this measure, it is also ensured that during operation of the robot, conductors do not come out of the channel 9 unintentionally.

The conductor guiding apparatus is spatially deflectable. To this end, the members have suitably designed joints. As may be seen from the illustrations in FIGS. 3 and 4, two adjacent members may be linked to each other via a ball joint. To this end, on one end of the central body 5, a spherical joint body 12 is formed. On the opposing end of the central body 5, a correspondingly designed joint socket 13 is provided.

The member 4 has means in order to delimit the spatial deflection. These means comprise three stops in the embodiment illustrated. The stops are formed by projections 14 directed radially outwards. The projections 14 are formed on the joint body 12 and are distributed equidistant from each other over the joint body 12. In the embodiment illustrated, the projections 14 give way to the webs 8.

The joint socket 13 has three recesses 15 into which the projections 14 engage when two members are linked to each other. The rotation angle may be determined through the design of the projections 14 and the form of the recesses 15. The possibility exists that the conductor guiding apparatus has different deflection angles in different sections, so that said apparatus is adapted to the movement of the robot.

In FIG. 2, the conductor guiding apparatus 1 is built up from members 4 having walls 7 whose width is smaller than the width of the central bodies 5, so that free spaces 16 exist between the walls 7 of adjacent chain members. In order to provide a substantially closed conductor guiding apparatus for a robot, the conductor guiding apparatus may be constructed of individual members as shown in FIGS. 5 and 6. The basic design of the member 4 is shown in FIGS. 5 and 6. The member substantially corresponds to the design of a member 4 as shown in FIGS. 3 and 4.

The member shown in FIGS. 5 and 6 has a surrounding wall 7. The wall 7 has a substantially cone-shaped section 17 narrowing from one end face 18 in the direction of the opposing end face 19. Formed at a separation from the end face 19 is a section 20 of the wall 7. The section 20 is designed arched.

The webs 8 which connect the wall 7 to the central body 5 are separated from the end face 18 and from the end face 19.

If two members as represented in FIG. 5 or FIG. 6 are linked to each other, the section 20 engages in the space delimited by the section 19, so that in the extended position of the members, a closed channel is formed. The section 20 is designed such that it permits spatial deflection of two members linked to one another. The further design of the member according to FIG. 5 or FIG. 6 corresponds to the design of the member according to FIGS. 3 and 4.

FIGS. 7 and 8 show a derivation of the member shown in FIGS. 5 and 6. The difference between the member according to FIGS. 7 and 8 and the member according to FIGS. 5 and 6 consists therein that the wall 7 is subdivided by gaps 10. This provides the possibility of introducing conductors into the members through the gaps 10.

In order to attach the conductor guiding apparatus to the robot, holders 2 are provided. A preferred embodiment of the design of a holder 2 is shown in FIGS. 9 and 10. The holder 2 is substantially designed clamp-shaped. It has a base body 21 having a receptacle 22. The base body 21 may be attached via attachment means to the robot, which is not shown. By means of a joint 23, the base body 21 is linked to a closing body 24. The closing body also has a receptacle 25. In the closed condition of the holder 2, a member 4 lies within the receptacle 22, 25, whereby the holder 2 is linked to the member 4 in form-fitting and/or force-fitting manner.

The base body 21 and the closing body 24 have brackets 26 each of which is designed with a bore 27. In the closed condition of the holder 2, the brackets lie one behind the other, whereby the bores 27 are coaxial with each other. By means of a bolt 28, the bodies 21, 24 are linked to each other, whereby the bolt 28 extends into the openings 27. The free end of the bolt 28 is designed such that it enters into a latching connection with one of the brackets. The joint 23 is also correspondingly designed so that the holder 2 may optionally be opened from the one or the other side.

FIG. 11 shows a base 29 of a robot. In the region of the base 29, a device 30 for guiding and storing a conductor guiding apparatus 1 is formed. The apparatus has a guiding region 31 formed in a first plane and a storage region 32 formed in a second plane different from the first plane.

In the embodiment shown, the guiding region 31 is substantially formed in a horizontal plane. The storage region 32 is formed in a substantially vertical plane.

FIG. 12 shows that the guiding region is designed in the form of a channel. In the embodiment shown, the guiding region 31 surrounds the base 29 over its entire circumference. This is not absolutely necessary. The storage region 32 is substantially formed box-shaped.

Between the guiding region 31 and the storage region 32, a transition region 33 is formed. Within the transition region 33 there is the possibility, dependent upon the movement of the robot, that the conductor guiding apparatus (not shown) is introduced into the guiding region either in the clockwise direction or the anticlockwise direction, as indicated by the arrows in FIG. 12. The guiding region, the storage region and/or the transition region are at least partially designed as formed parts and, in particular, as sheet metal formed parts. In a perspective view, FIG. 13 shows part of the guiding region 31 and of the transition region 33. A mirror axis is drawn in dashed, so that the guiding region and the storage region may be designed as mirror images.

For the formation of a radius of curvature for the conductor guiding apparatus, a circular insert 34 is arranged in the storage region 32, as is apparent from FIG. 11.

FIGS. 14 to 17 show a further embodiment of the apparatus for guiding and storage of a conductor guiding apparatus in the base of a robot. The apparatus has a guiding region 31 which in the embodiment shown partially surrounds the base 29 of the robot. The guiding region 31 is formed U-shaped in cross-section. The floor 35 of the guiding region 31 rises in helical manner. The guiding region 31 is linked to the storage region 32. The storage region 32 has a wall 36 in the form of a truncated cone. An L-shaped border 37 is connected to the wall 36. In the embodiment shown, the guiding region 31 surrounds the base over an angle of approximately 180°. The storage region 32 also surrounds the base over an angle of approximately 180°.

FIGS. 18 and 19 show snapshots of the position of a robot. The robot has a base 29 which is surrounded by a device 30 for guiding and storage of a conductor guiding apparatus 1. The robot is attached by means of a driver 38 to one end of the conductor guiding apparatus 1. The opposing end 39 of the conductor guiding apparatus 1 is arranged in fixed position.

FIG. 18 shows the conductor guiding apparatus 1 in the storage region 32. The lower strand of the conductor guiding apparatus lies in the border 37 and against the wall 36. The curved bend region of the conductor guiding apparatus which lies between the lower strand and the upper strand, lies against the wall 36. The conductor guiding apparatus 1 is preferably designed such that with a suitable design of the jointed connections between the members of the conductor guiding apparatus, the bent region of the conductor guiding apparatus always comes to lie against the wall 36, so that an additional cover which could simultaneously serve as guidance may be dispensed with. However, this is not necessarily required. Such a cover may also be suitable for safety reasons.

FIG. 19 shows a snapshot in which the robot with the driver 38 is rotated such that the driver 38 with the conductor guiding apparatus 1 reaches the guiding region 31. The conductor guiding apparatus is guided into the guiding region 31. Through the design of the apparatus for guiding and storage of the conductor guiding apparatus, the possibility is created that the robot with the driver 38 may cover a circumferential angle of up to 360°.

REFERENCE NUMBER LIST

1 Conductor guiding apparatus
2 Holder
3 Conductor
4 Member
5 Central region
6 Linking element
7 Wall
8 Web
9 Channel
10 Gap
11 Passageway
12 Joint body
13 Joint socket
14 Projection
15 Recess
16 Free space
17 Section
18 End face
19 End face
20 Section
21 Base body
22 Receptacle
23 Joint
24 Closing body
25 Receptacle
26 Bracket
27 Opening
28 Bolt
29 Base
30 Apparatus
31 Guiding region
32 Storage region
33 Transition region
34 Insert
35 Floor
36 Wall
37 Border
38 Driver
39 End of the conductor guiding apparatus

The invention claimed is:

1. A robot having a conductor guiding apparatus for guiding flexible members, the conductor guiding apparatus comprising:
   a plurality of members, each member having a central body and defining a conductor channel;
   a flexible linking element extending through the central body of the members to join the members together for movement relative to one another;
   a spatial deflection limiting, wherein the spatial deflection limiting mechanism comprises at least one stop connected to a first member and at least one counterstop connected to a second member disposed adjacent to the first member; and
   wherein at least one stop is formed by a projection directed radially outwards, said projection engaging in a recess on an adjacent member to limit spatial deflection.

2. The robot according to claim 1, wherein adjacent members are linked in form-fitting manner to each other.

3. The robot according to claim 1, wherein at least two adjacent members are linked to each other by a ball joint.

4. The robot according to claim 1, wherein at least one projection is formed on a joint body and the recess is formed in a joint socket.

5. The robot according to claim 1 wherein the stop comprises at least two projections joined to a member and arranged substantially equidistant from each other.

6. The robot according to one of the claim 1, wherein the central body comprises at least one web linked to a wall, whereby the wall and the central body define the channel.

7. The robot according to claim 6, wherein the has at least one gap extending in the longitudinal direction of the central body.

8. The robot according to claim 6 wherein sections of the walls of two adjacent members overlap each other.

9. The robot according to claim 1 and further comprising holders attaching the conductor guiding apparatus to the robot.

10. The robot according to claim 9, wherein the holders are clamps that are shaped for securing the wall of a member.

11. The robot according to claim 9 wherein the holder is linked to a member in a form-fitting manner.

12. A robot having a conductor guiding apparatus for guiding flexible members, the conductor guiding apparatus comprising:
   a plurality of members, each member having a central body and defining a conductor channel;
   a flexible linking element extending through the central body of the members to join the members together for movement relative to one another;
   and apparatus for guiding and storing the conductor guiding apparatus in the robot, wherein the apparatus has a guiding region formed in a first plane and a storage region formed in a second plane, and the second plane is formed separately from the first plane.

13. The robot according to claim 12, wherein the guiding region lies in a substantially horizontal plane.

14. The robot according to claim 12 wherein the first and second planes lie at an angle of up to 90° to each other.

15. The robot according to claim 12 wherein the storage region lies in a substantially vertical plane.

16. The robot according to claim 12 wherein the guiding region defines a channel.

17. The robot according to claim 12 wherein the guiding region is arc-shaped.

18. The robot according to claim 12 wherein the storage region receives the conductor guiding apparatus to define an upper strand and a lower strand in the storage region.

19. The robot according to claim 12 wherein the guiding region and the storage region are detachably linked to each other.

20. The robot according to claim 12 wherein the guiding region and the storage region, a transition region.

21. The robot according to claim 12 wherein the guiding region, the storage region or the transition region are at least partially formed as molded parts.

* * * * *